April 15, 1958  C. L. MOORMAN ET AL  2,830,858
FLUID SEAL

Filed July 1, 1955  2 Sheets-Sheet 1

INVENTORS
CLETUS L. MOORMAN
ELLWOOD F. RIESING
BY
THEIR ATTORNEY

April 15, 1958 — C. L. MOORMAN ET AL — 2,830,858
FLUID SEAL
Filed July 1, 1955 — 2 Sheets-Sheet 2

INVENTORS
CLETUS L. MOORMAN
ELLWOOD F. RIESING
BY
THEIR ATTORNEY

United States Patent Office 2,830,858
Patented Apr. 15, 1958

2,830,858

FLUID SEAL

Cletus L. Moorman, Trotwood, and Ellwood F. Riesing, Dayton, Ohio, assignors to General Motors Corporation, Detroit, Mich., a corporation of Delaware Application July 1, 1955, Serial No. 519,573

4 Claims. (Cl. 308—187.2)

This invention relates to fluid seals and in particular to seals adapted to seal the space between relatively rotatable members.

It is common practice to install a fluid seal at the end of a lubricant chamber associated with anti-friction members or bearings interposed between relatively rotatable members to prevent the egress of lubricant from and the ingress of dirt, water and other deleterious materials. One application for seals of this type is in connection with the lubricant chamber of anti-friction bearings such as ball and roller bearings. Frequently, bearing installations develop and operate under relatively high temperatures which results in the building up of considerable pressures. Such pressures are imposed against the fluid seal of the bearing installation and may cause the seal to be blown out of the installation unless suitable provision is made to hold the seal securely within the bearing race or housing member which supports the seal. A similar problem arises where the bearing or lubricant chamber operates under considerable pressures, or where it is necessary to inject lubricant into the bearing mechanism under considerable pressure. In the past, seals have been provided which are effective to various degrees in resisting being blown out. However, such seals are either unsatisfactory for relatively high pressure installations or include relatively elaborate means for holding the seal securely against lubricant chamber pressures.

It is an object of this invention to provide a fluid seal which may be readily installed to effectively seal the space between relatively rotatable parts but which requires considerable pressure or force to dislodge it from its installed and operating position.

It is a further object of this invention to provide a fluid seal for installation between relatively rotatable members and across a lubricant chamber, one of the members having an annular depression facing the other member. The seal has an elastomeric annular body member snugly and compressibly engaging the depression containing member and has an annular radially projecting portion seated in the depression. A frustro-conical ring is embedded in the body which is positioned with its greatest diameter edge facing the lubricant chamber and disposed relatively close to the depression containing member and so that it compressibly supports a substantial cushion of elastomeric seal body and the annular projection against the depression containing member whereby the seal may be easily installed, but dislodged with considerable difficulty.

Further objects and advantages of the present invention will be apparent from the following description, reference being had to the accompanying drawings wherein preferred embodiments of the present invention are clearly shown.

Figure 1:
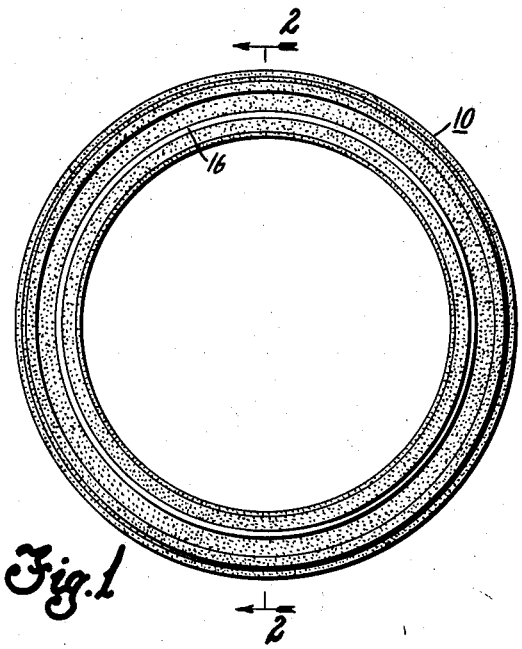
Figure 1 is a side elevational view of a fluid seal.
Figure 2:
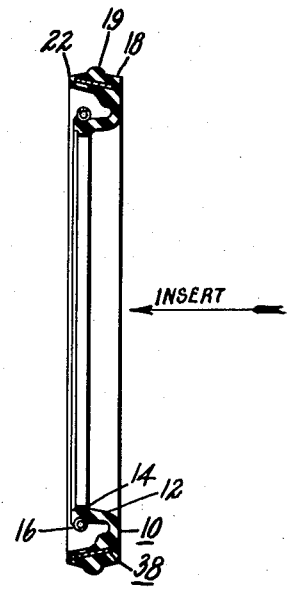
Figure 2 is a cross sectional view of the seal of Figure 1 taken along line 2—2.
Figure 3:
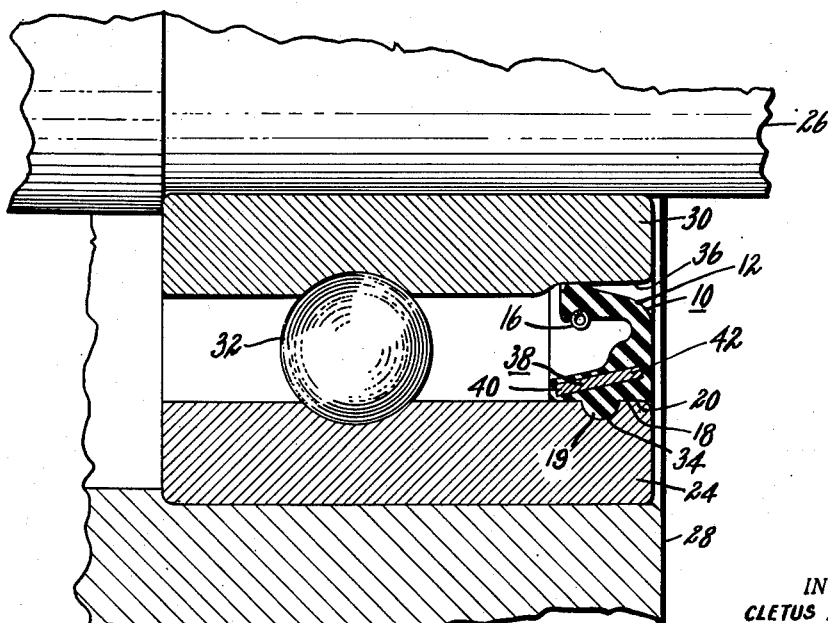
Figure 3 is a cross sectional view of a portion of a ball bearing showing a seal interposed between the bearing races, associated with a shaft and a housing.

Figures 1 and 2 show a fluid seal which includes an annular elastomeric body member 10 having connection integrally thereto, through a flexible diaphragm portion 12, a flexible sealing lip portion 14 which is adapted to be urged radially inwardly against a relative rotating member by a garter spring 16 and is shown installed between inner and outer ball bearing races in Figure 3.

The outer diameter 18 of the seal body 10 is of somewhat greater diameter than the internal diameter 20 of the housing bore or outer race bearing ring 24 (Figure 3) against which it is fitted whereby the seal body compressibly and snugly engages the retaining housing bore or bearing race. To facilitate easy insertion of the seal into the bearing race, the edge 22 of the seal body is of gradually reduced diameter to a point of being slightly less than the internal diameter of the bearing race ring whereby the seal may be readily inserted therein.

Referring to Figure 3, a shaft 26 and a housing member 28 has interposed therebetween a ball bearing assembly including an outer bearing race 24, an inner bearing race 30 and ball bearing 32 interposed between the bearing races. The outer bearing race 24 is provided with an internal annular depression or groove 34 and the inner bearing race 30 is provided with a portion 36 of reduced external diameter.

The seal body portion 10 is provided with a radially, outwardly projecting portion or rib 19 which is adapted to compressibly fit into depression or groove 34 of the outer race 24. A frustro-conical reinforcing member 38 is embedded within seal body 10 and has a sufficient axial dimension to extend substantially beyond the axial extremities of projection or rib 19. Preferably, the frustro-conical reinforcing member extends substantially from one radial side of seal body 10 to the other whereby the frustro-conical member may be readily and accurately positioned against the walls of a mold in the manufacture of the seal.

The frustro-conical member 38 has a radial dimension whereby the largest diameter edge 40 is positioned near to or adjacent the bearing race 24 while the smallest diameter edge 42 is positioned substantially spaced from the bearing race 24. This position of the frustro-conical member 38 supports a substantial mass or cushion of elastomeric material which is progressively greater in a direction axially outwardly of the seal body 10, i. e., in the direction opposite the direction of insertion of the seal and which is progressively smaller in a direction axially inwardly of seal body 10, i. e., in the direction of insertion.

On insertion of the seal between outer race 24 and inner race 30 of the bearing assembly, the elastomeric cushion lying outwardly of frustro-conical member 38 is compressed and distorted radially inwardly and axially outwardly of the bearing to permit the seal body to be inserted with relative ease. This compression and distortion is readily accomplished because of the substantial thickness of the rubber cushion between the frustro-conical member 38 and the race 24 outwardly of rib 19 and because the radially diminishing diameter of the frustro-conical member in a direction opposite to the direction of insertion offers no resistance to axial distortion of the rubber cushion. When the seal reaches its fully inserted position, the annular rib 19 snaps into groove 34 and remains seated therein under a substantial degree of compression whereby the seal is firmly seated in position. Since the removal of the seal body from the bearing assembly would require both a radial and an inward axial deformation of the rib 19 and the seal cushion between the frustro-conical member 38 and the race 24, the seal has a large capacity to resist removal from the bearing assembly because the increasing diameter of the frustro-conical member 38 axially inwardly of rib 19 tends to resist axial inward deformation of the seal body and the reduced radial thickness of the elastomeric cushion inwardly of rib 19 tends to prevent radial deformation of the seal body.

Figure 4:
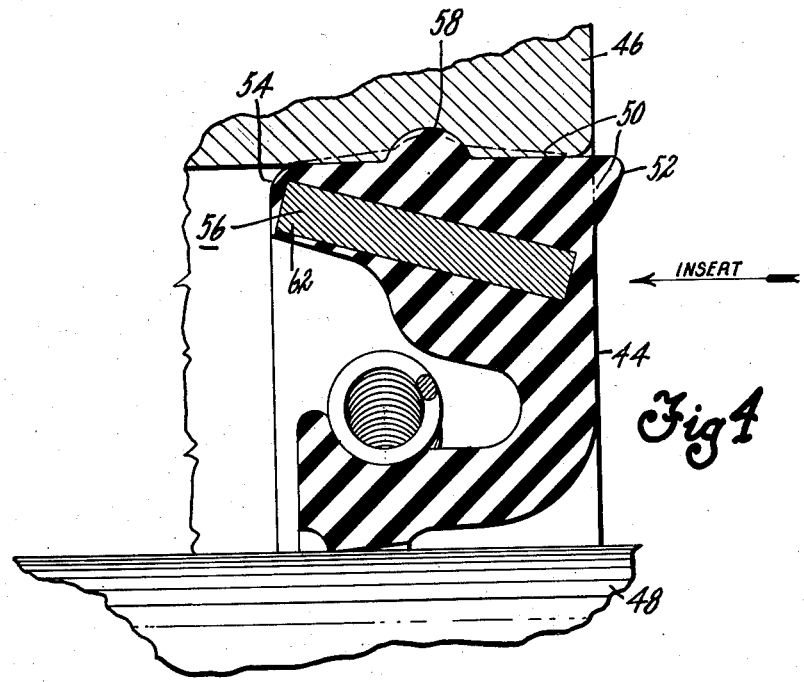
Figure 4 is a cross sectional view of a portion of the seal installed between a housing and a shaft showing the dimensions of the seal body in reference to the housing in dot-dash lines and the shape of the installed seal in solid lines immediately after insertion in the housing.
Figure 5:
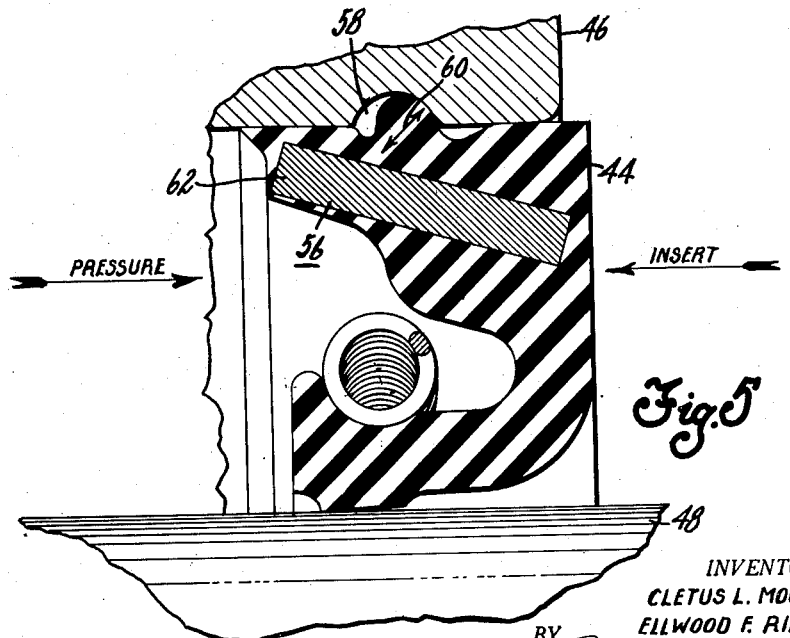
Figure 5 is a cross sectional view of a portion of the seal installed between a housing and a shaft showing the manner in which the seal may be distorted under lubricant chamber pressures.

The axial flow of the elastomeric cushion which lies between the frustro-conical member and the outer race ring or housing bore may be clearly seen in reference to Figures 4 and 5, showing the seal 44 installed between a housing 46 and a shaft 48. Figure 4 shows the shape of the seal body just as the insertion thereof is completed. The dot-dash lines 50 indicate the dimension the seal body would assume in a free shape. The bulge 52 of the seal body and distorted edge 54 show the axial outward flow of elastomeric material which is unhampered by frustro-conical member 56 whereby the seal is readily inserted into the housing. After the insertion of the seal, it gradually assumes a normal shape as shown in Figure 3. Figure 5 shows the seal 44 when subject to substantial lubricant chamber pressures. The removal or expulsion of the seal from the housing is resisted by compressive forces between frustro-conical member 56 and groove 58 at 60 and due to the fact that proximity of edge 62 to housing 46 tends to prevent inward axial flow of elastomeric material. For illustrative purposes, the edge 62 is shown somewhat spaced from housing 46 to permit some axial inward flow of rubber. However, it is obvious that edge 62 may be positioned adjacent housing 46 to virtually prevent the inward axial flow of elastomeric material and thereby securely lock the seal in the housing.

Tests have shown that a seal installation constructed in accordance with the present invention requires up to 10 times as much pressure to remove the seal from a bearing installation than was necessary to install the seal in the bearing. It may readily be seen that the degree to which the seal is locked within the bearing depends largely on the proximity of the edge 40 of frustro-conical member 38 to the bearing race 24 and the degree to which the frustro-conical member is sloped from a true cylinder. Thus, an optimum locking effect is obtained when edge 40 is adjacent race 24 whereby maximum resistance to axial flow of elastomeric material is attained. If the walls of frustro-conical member 38 have an angle with respect to an axial plane which is excessive, excessive radial deformation of the seal body will be permitted so as to minimize the locking effect. The optimum shape of the frustro-conical member 38 and the proximity of the edge 40 to bearing race 24 may be readily determined experimentally to achieve the result desired.

The present seal, although simple in construction, has a number of desirable features and is well suited to mass production methods. The rib 19, as previously explained, cooperates with the frustro-conical member 38 to serve as a means for locking the seal in place. Further, the rib 19 assures true diametrical alignment of the seal as well as axial location. In embodiments wherein the edge 40 of the frustro-conical member is disposed adjacent the race 24, the edge 40 cooperates with other elements, as previously described, to lock the seal in place and, further, to maintain true radial alignment of the seal with respect to race 24.

Although the present invention has been described in terms of a seal for a ball bearing, it is obvious that it may readily be modified and adapted for general use in connection with shafts and housings, for example.

The present seal may be molded and vulcanized in a manner well known in the art. To facilitate the manufacturing process, the frustro-conical member preferably extends to at least one radial wall of the seal body whereby it may be readily positioned to a mold.

The elastomeric material referred to throughout the specification includes the various elastomeric materials suitable for use in fluid seals, for example, natural rubber, butadiene styrene copolymers, butadiene acrylonitrile copolymers, polychloroprene, compatible mixtures of the above, and other useful natural and synthetic materials having suitable elastomeric characteristics. The choice of materials is usually dictated by the fluid to be sealed and preferred materials for bearing seals include those having a high resistance to heat and lubricating oils and greases.

A related fluid seal is disclosed in copending application, Serial No. 519,572, assigned to the assignee of the present invention.

While the embodiments of the present invention as herein disclosed, constitute preferred forms, it is to be understood that other forms might be adopted.

What is claimed is as follows:

1. In combination, a rotatable member, a non-rotatable member disposed about said rotatable member in concentric and spaced relationship, said non-rotatable member having an inner annular groove integrally formed therein, a seal member extending across the space between said members for sealing the space therebetween, said seal member including an elastomeric annular seal body portion of substantial mass adapted to snugly engage the inner surface of said non-rotatable member, said seal body portion including a radially projecting annular rib adapted for insertion within said groove, and a frustro-conical reinforcing member embedded in said seal body portion and being positioned so that a conical surface of said reinforcing member backs up and supports a substantial portion of said seal body portion and said rib against said non-rotatable member, said reinforcing member having its largest diameter positioned near to said non-rotatable member and facing axially inwardly of said seal body.

2. In combination, first and second concentric relatively rotatable members held in spaced apart relationship, the first of said members having an annular depression integrally formed therein, a seal member extending across the space between said relatively rotatable members for sealing the space therebetween, said seal member including an elastomeric annular seal body portion of substantial mass adapted to snugly engage said first member, said seal body portion having a radially projecting annular portion adapted to be inserted within said annular depression, and a frustro-conical reinforcing member embedded in said seal body portion and positioned so that the largest diameter thereof is positioned near to said first member and the other end thereof is positioned a substantially greater radial distance from said first member whereby a conical portion of said reinforcing ring supports a substantial portion of elastomeric body including said annular projection against the annular depression of said first member, said largest diameter of said frustro-conical member facing axially inwardly of said seal body.

3. In combination, an anti-friction bearing including inner and outer bearing races with interposed anti-friction bearing members, said outer ring having an annular groove on the inner face thereof, a seal member to extend across the space between said races, said seal member including an elastomeric annular seal body portion of substantial mass adapted to snugly engage said outer race, said seal body having an annular rib projecting radially and outwardly thereof adapted for insertion within said groove and a frustro-conical reinforcing member embedded in said seal body portion and being positioned so that conical surfaces of said reinforcing member backs up and supports a substantial portion of said seal body portion and said rib against said first member, said reinforcing member having its largest diameter positioned on the bearing side of said seal body.

4. In combination, first and second concentric relatively rotatable members held in spaced apart relation, the first of said members having an annular depression integrally formed therein, a seal member extending across a lubricant chamber between said relatively rotatable members for sealing the space therebetween, said seal member including an elastomeric annular seal body portion adapted to snugly engage said first member, a sealing lip portion adapted to wipingly engage said second member, a flexible diaphragm portion flexibly connecting said seal body portion and said sealing lip portion, said seal body portion including a radially projecting annular portion adapted to be inserted within said depression, and a frustro-conical ring embedded in said seal body portion and positioned so that the largest diameter thereof is positioned near to said first member and in the direction of said lubricant chamber and conical surfaces thereof backing up and supporting said radially projecting annular portion against said depression.

References Cited in the file of this patent

UNITED STATES PATENTS

| | | |
|---|---|---|
| 2,417,390 | Winkeljohn | Mar. 11, 1947 |
| 2,613,090 | Hickling | Oct. 7, 1952 |
| 2,697,623 | Mosher | Dec. 21, 1954 |

FOREIGN PATENTS

| | | |
|---|---|---|
| 156,499 | Australia | May 14, 1954 |